(12) United States Patent
Konchan et al.

(10) Patent No.: US 8,342,592 B2
(45) Date of Patent: Jan. 1, 2013

(54) MULTI LINK RETRACTING SEAL SURFACE MODULE

(75) Inventors: Jeffrey L. Konchan, Romeo, MI (US); Steven Bauer, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 55 days.

(21) Appl. No.: 12/968,343

(22) Filed: Dec. 15, 2010

(65) Prior Publication Data

US 2012/0153678 A1    Jun. 21, 2012

(51) Int. Cl.
- *B60J 5/04* (2006.01)
- *B60J 5/00* (2006.01)
- *E05D 11/10* (2006.01)
- *E05D 15/30* (2006.01)

(52) U.S. Cl. ............ 296/146.1; 296/146.11; 296/146.2; 296/202; 16/360; 16/334

(58) Field of Classification Search ............... 296/146.1, 296/202, 146.2, 203.01, 203.03, 203.04, 296/146.3, 146.15, 146.11; 16/382; 49/502; E05D 11/10, 15/30; B60J 5/04, 5/00
See application file for complete search history.

(56) References Cited

U.S. PATENT DOCUMENTS

| 2,265,434 | A | * | 12/1941 | Kibbey | 296/16 |
| 3,085,297 | A | * | 4/1963 | Linderfelt | 49/248 |
| 3,538,641 | A | * | 11/1970 | Lux et al. | 49/192 |
| 4,854,010 | A | * | 8/1989 | Maraghe et al. | 16/360 |
| 5,561,887 | A | * | 10/1996 | Neag et al. | 16/334 |
| 6,694,676 | B2 | * | 2/2004 | Sakamoto et al. | 49/366 |
| 6,802,154 | B1 | * | 10/2004 | Holt et al. | 49/26 |
| 7,144,064 | B2 | * | 12/2006 | Azzouz et al. | 296/146.1 |
| 7,488,029 | B2 | * | 2/2009 | Lechkun et al. | 296/146.1 |

* cited by examiner

*Primary Examiner* — Glenn Dayoan
*Assistant Examiner* — Sunsurraye Westbrook
(74) *Attorney, Agent, or Firm* — Quinn Law Group, PLLC

(57) ABSTRACT

A seal module for sealing between a first door and a second door of opposing-hinged doors is moveable between an sealing position for sealing between the first door and the second door, and a withdrawn position longitudinally spaced from one of the first door and the second door to allow for independent pivotable movement of either the first door or the second door. A linkage system including a first swing arm and a second swing arm rotatably interconnects the seal module to the second door, and moves the seal module between the sealing position and the withdrawn position along an arcuate path that is disposed along a plane substantially perpendicular to an outer surface of the opposing-hinged doors.

16 Claims, 6 Drawing Sheets

MULTI LINK RETRACTING SEAL SURFACE MODULE

TECHNICAL FIELD

The invention generally relates to a seal module for sealing between a pair of opposing-hinged doors of a vehicle.

BACKGROUND

Opposing-hinged doors on vehicles include a first door and a second door arranged on the same side of the vehicle, longitudinally adjacent to each other, with the first door disposed nearer a forward end of the vehicle than the second door. Each of the opposing-hinged doors pivots open in an opposite direction. More specifically, the first door includes a forward edge disposed nearer the forward end of the vehicle and a rearward edge disposed nearer a rearward end of the vehicle. The second door also includes a forward edge disposed nearer the forward end of the vehicle and a rearward edge disposed nearer the rearward end of the vehicle. The first door is hinged along the forward edge of the first door, and pivots in a first pivot direction such that the rearward edge of the first door swings away from the vehicle when opening and toward the vehicle when closing the first door. The second door is hinged along the rearward edge of the second door, and pivots open in a second pivot direction, which is opposite the first pivot direction, such that the forward edge of the second door swings away from the vehicle when opening and toward the vehicle when closing the second door. Accordingly, the first door and the second door open in opposite directions.

When the vehicle does not include a body pillar between the first door and the second door to define a continuous opening, the vehicle typically includes a seal disposed between the first door and the second door. The seal is attached to one of the first door and the second door, with the first door and the second door sealing against each other. The first door and the second door are thus, "dependent". That is, one vehicle door, usually the front door, must be opened before the rear door can be opened, and the rear door must then be closed before the front door can be closed. The doors are dependent so that one door can seal to the other door when the doors are closed, because there is no body pillar between the doors that the doors could otherwise seal to and be operated independently.

SUMMARY

A vehicle includes a body, and a pair of opposing-hinged doors mounted to the body. The pair of opposing-hinged doors include a first door and a second door, each defining an outer surface. A seal module is moveable between a sealing position and a withdrawn position. The seal module is disposed in sealing engagement adjacent the outer surface of the first door and the second door when in the sealing position. The seal module is longitudinally spaced from one of the pair of opposing-hinged doors when in the retracted position. The retracted position allows independent movement of each of the opposing-hinged doors relative to the other of the opposing-hinged doors. A linkage system pivotably interconnects the seal module and the second door. The linkage system is configured for moving the seal module along an arcuate path. When moving from the sealing position into the withdrawn position, the arcuate path initially directs the seal module away from the outer surface of the first door and the second door, and then directs the seal module along a longitudinal axis away from the first door. When moving from the withdrawn position into the sealing position, the arcuate path initially directs the seal module along the longitudinal axis toward the first door, and then directs the seal module toward the outer surface of the first door and the second door.

A vehicle includes a body. A first door is pivotable relative to the body in a first pivot direction. A second door is pivotable relative to the body in a second pivot direction. The second door and the first door are disposed adjacent each other, the second pivot direction is opposite the first pivot direction, and each of the first door and the second door define an outer surface. A seal module is moveable between a sealing position and a withdrawn position. The seal module is disposed in sealing engagement adjacent the outer surface of the first door and the second door when in the sealing position. The seal module is longitudinally spaced from one of the pair of opposing-hinged doors when in the retracted position. The retracted position allows independent movement of each of the opposing-hinged doors relative to the other of the opposing-hinged doors. A linkage system pivotably interconnects the seal module and the second door. The linkage system is configured for moving the seal module along an arcuate path that is disposed along a generally horizontal plane. When moving from the sealing position into the withdrawn position, the arcuate path initially directs the seal module in a substantially transverse direction away from the outer surface of the first door and the second door, and then directs the seal module in a substantially longitudinal direction away from the first door. When moving from the withdrawn position into the sealing position, the arcuate path initially directs the seal module in a substantially longitudinal direction toward the first door, and then directs the seal module in a substantially transverse direction toward the outer surface of the first door and the second door.

Accordingly, the seal module moves into the retracted position to not interfere with opening and/or closing movement of either of the pair of opposing-hinged doors. As such, when the seal module is in the retracted position, either of the pair of opposing-hinged doors may be opened independently of the other door.

The above features and advantages and other features and advantages of the present invention are readily apparent from the following detailed description of the best modes for carrying out the invention when taken in connection with the accompanying drawings.

DETAILED DESCRIPTION

Referring to the Figures, wherein like numerals indicate like parts throughout the several views, a vehicle is shown generally at 20.

Figure 1:
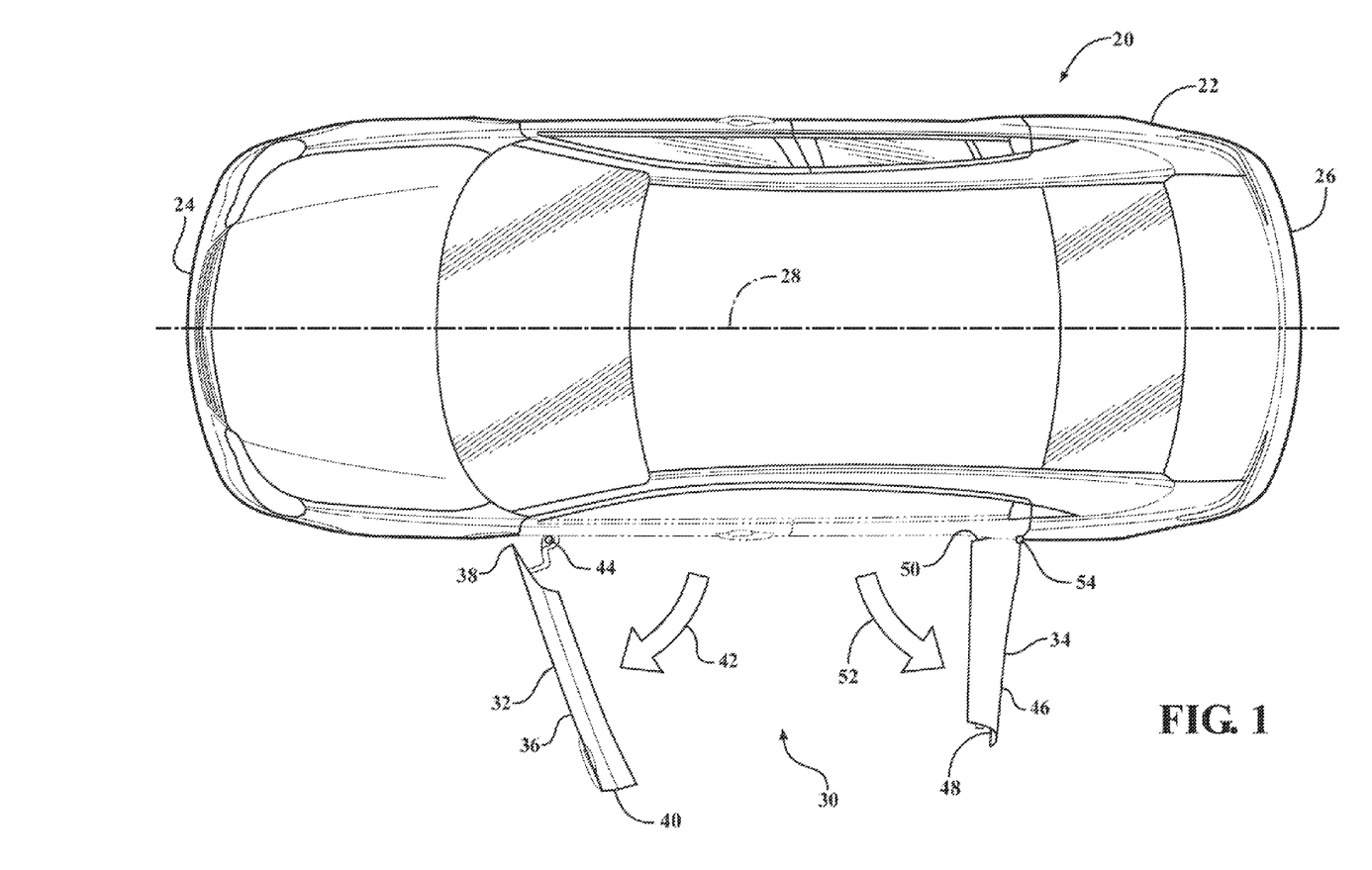
FIG. 1 is a schematic top plan view of a vehicle showing a pair of opposing-hinged doors in an open position.
Figure 2:
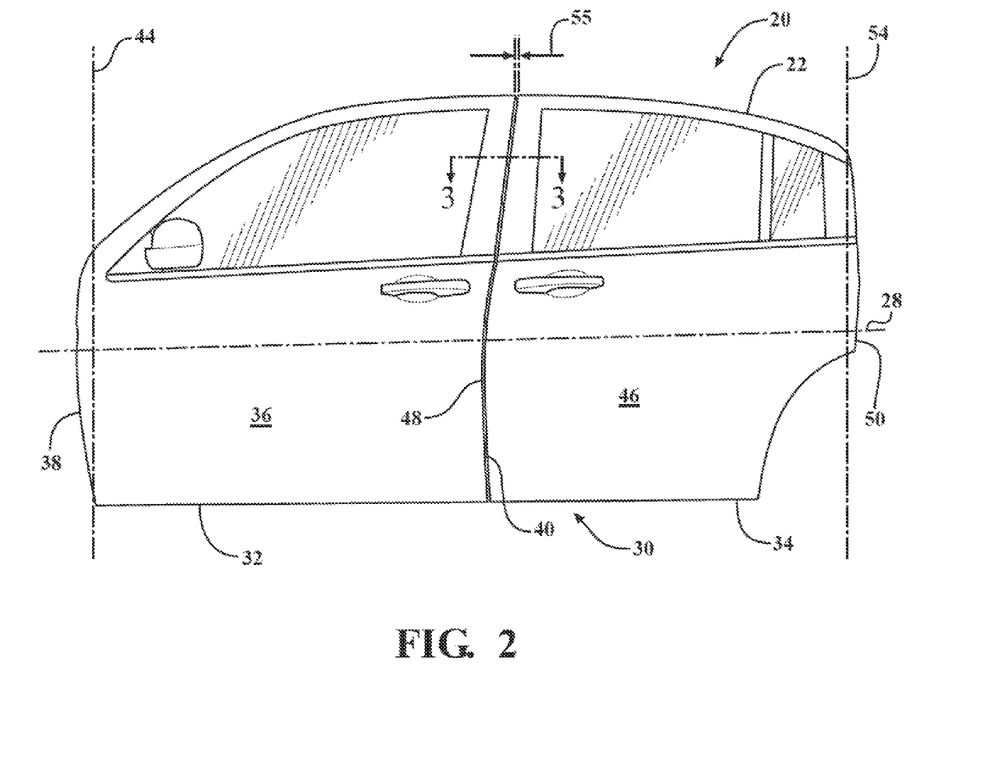
FIG. 2 is a schematic side view of the vehicle showing the pair of opposing-hinged doors in a closed position.

Referring to FIGS. 1 and 2, the vehicle 20 includes a body 22. The body 22 includes a first end 24 and a second end 26. The second end 26 is disposed opposite the first end 24 along a longitudinal axis 28 of the body 22. The first end 24 of the vehicle 20 may be referred to as, but is not limited to, a front end of the vehicle 20. The second end 26 of the vehicle 20 may be referred to as, but is not limited to, a rear end of the vehicle 20.

A pair of opposing-hinged doors 30 is mounted to the body 22. The pair of opposing hinged doors 30 may include any pair of opposing-hinged closure panels, including but not limited to, side occupant doors, rear cargo doors, windows, etc. As shown, the opposing-hinged doors 30 are disposed adjacent each other on the same longitudinal side of the body 22, and open in opposite directions, away from each other to provide a continuous, i.e., unobstructed, opening into an interior compartment of the vehicle 20. It should be appreciated that the pair of opposing-hinged doors 30 may be disposed elsewhere on the vehicle 20, for example at the rear end of the vehicle 20.

The pair of opposing-hinged doors 30 includes a first door 32 and a second door 34. The first door 32 and the second door 34 close toward each other and are disposed adjacent each other when in a closed position, with no body 22 pillar disposed between the first door 32 and the second door 34. While the first door 32 and the second door 34 are disposed adjacent each other when in the closed position, the first door 32 and the second door 34 are not in direct contact with each other. The first door 32 may be referred to as, but is not limited to, a front door of the vehicle 20. The first door 32 defines an outer surface 36, and includes a forward edge 38 disposed toward the first end 24 of the body 22 and a rearward edge 40 disposed toward the second end 26 of the body 22. The first door 32 is pivotable relative to the body 22 in a first pivot direction 42. The first door 32 pivots about a first pivot axis 44, which is disposed adjacent the forward edge 38 of the first door 32. The second door 34 may be referred to as, but is not limited to, a rear door of the vehicle 20. The second door 34 defines an outer surface 46, and includes a forward edge 48 disposed toward the first end 24 of the body 22 and a rearward edge 50 disposed toward the second end 26 of the body 22. The second door 34 is pivotable relative to the body 22 in a second pivot direction 52. The second door 34 pivots about a second pivot axis 54, which is disposed adjacent the rearward edge 50 of the second door 34.

The second pivot direction 52 is opposite the first pivot direction 42. As shown, the first pivot direction 42 includes a clockwise direction and the second pivot direction 52 includes a counterclockwise direction. However, it should be appreciated that the relative positions of the first door 32 and the second door 34s may be reversed, such that the first pivot direction 42 includes a counterclockwise direction and the second pivot direction 52 includes a clockwise direction.

The first door 32 and the second door 34 are "opposing-hinged doors" as the first door 32 and the second door 34 pivot open respectively in opposite directions. The opposing-hinged doors 30 allow for a continuous opening defined by the body 22, with no B-pillar disposed between the first door 32 and the second door 34. The first door 32 and the second door 34 are independently openable and closeable, i.e., may be opened and closed in either order or simultaneously. Because the opening defined by the body 22 is continuous, with no B-pillar between the first door 32 and the second door 34, the first door 32 and the second door 34 define a gap 55 therebetween that should be sealed.

Figure 3:
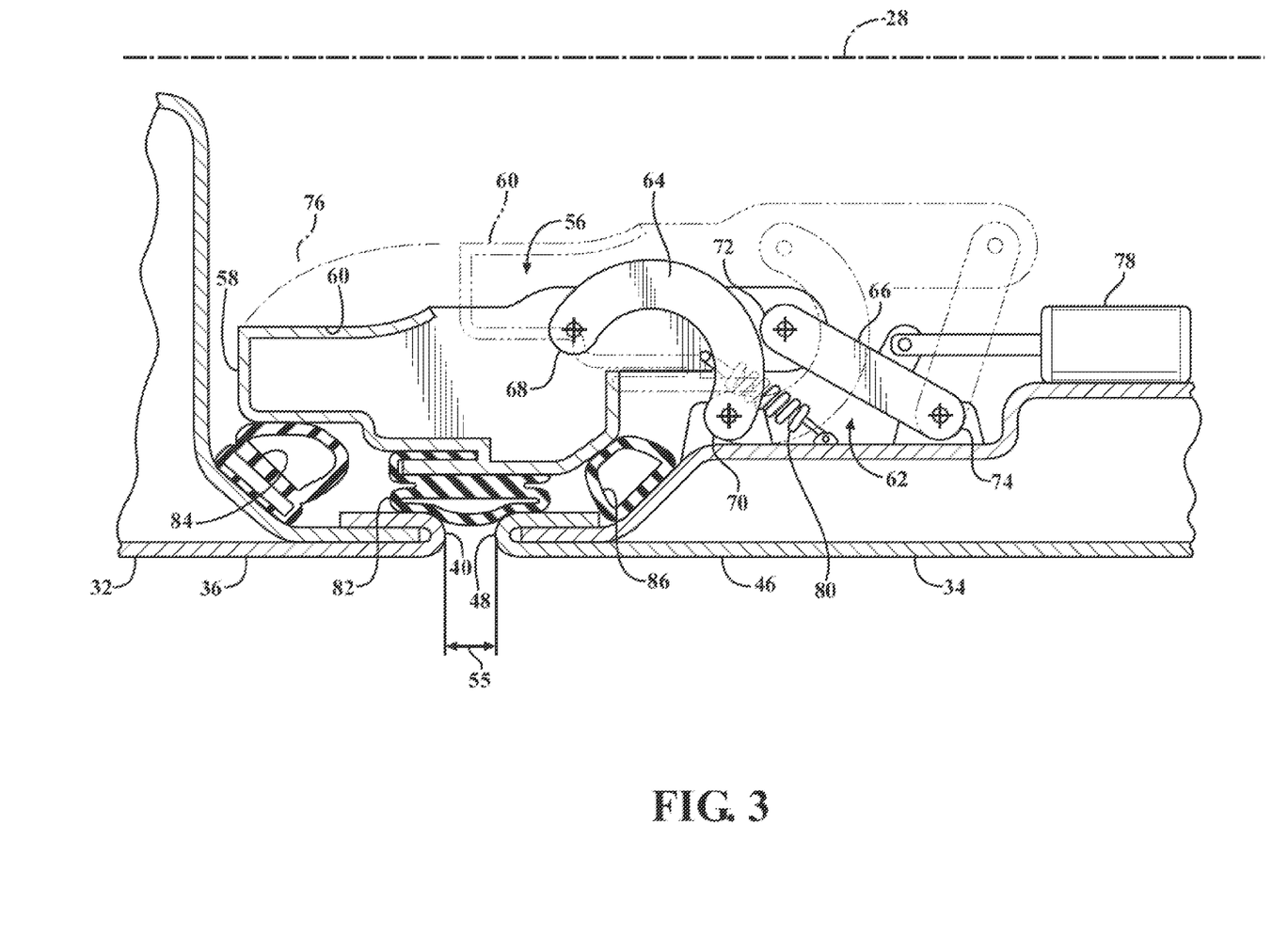
FIG. 3 is a schematic cross sectional view taken along cut line 3-3 shown in FIG. 2 of the pair of opposing-hinged doors showing a seal module for sealing therebetween the pair of opposing-hinge doors in a sealing position.
Figure 4:
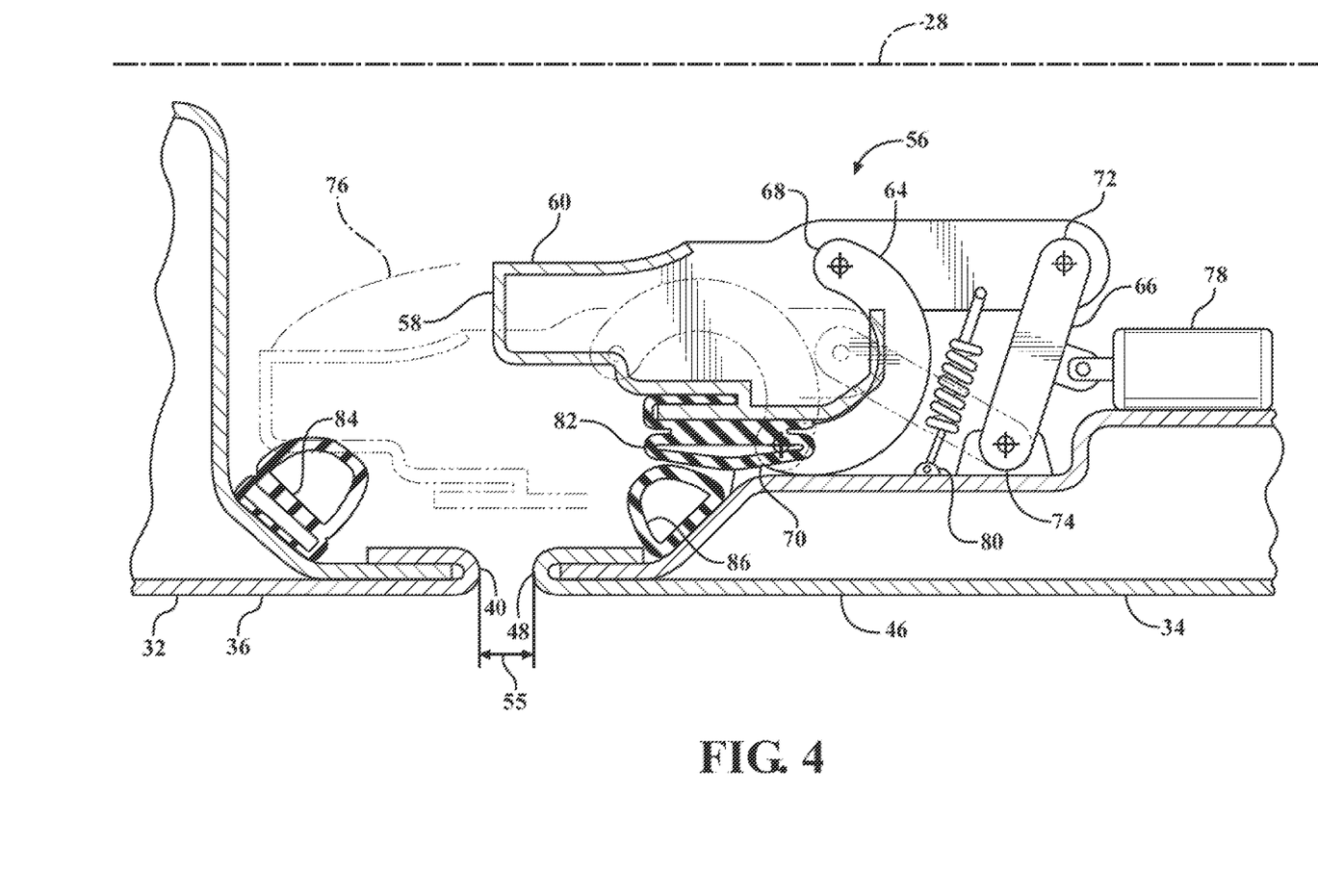
FIG. 4 is a schematic cross sectional view of the pair of opposing-hinged doors showing the seal module in a withdrawn position.

Referring to FIGS. 3 and 4, a seal module 56 is attached to one of the first door 32 or the second door 34. As shown, the seal module 56 is attached to the second door 34. The seal module 56 is moveable between a sealing position, shown in FIG. 3, and a withdrawn position, shown in FIG. 4. The seal module 56 is disposed in sealing engagement adjacent the outer surface 36 of the first door 32 and the outer surface 46 of the second door 34 when in the sealing position. The seal module 56 is longitudinally spaced from one of the pair of opposing-hinged doors 30 when in the withdrawn position. As shown, the seal module 56 is longitudinally spaced along the longitudinal axis 28 from the first door 32 when in the withdrawn position. As such, when in the withdrawn position, a forward end 58 of the seal module 56 is spaced a distance from the rearward edge 40 of the first door 32. However, it should be appreciated that if the seal module 56 is instead attached to the first door 32, then the seal module 56 would be longitudinally spaced from the second door 34 when in the withdrawn position. The seal module 56 is spaced from the first door 32 when in the withdrawn position to allow independent movement of each of the opposing-hinged doors 30 relative to the other of the opposing-hinged doors 30. As such, when in the withdrawn position, the first door 32 may be opened and/or closed independently of the second door 34, and the second door 34 may be opened and/or closed independently of the first door 32.

The seal module 56 includes a base 60. The base 60 may be shaped and/or sized in any suitable manner for the specific design configuration of the vehicle 20. The base 60 may be manufactured from a rigid material, such as but not limited to a metal, from a compliant material, such as but not limited to rubber, or from a combination of rigid and compliant materials.

A linkage system 62 pivotably interconnects the seal module 56 and the one of the pair of opposing-hinged doors 30 that the seal module 56 is attached to. As shown, the linkage system 62 interconnects the seal module 56 with the second door 34. However, if the seal module 56 is attached to the first door 32, then the linkage system 62 would interconnect the seal module 56 with the first door 32.

The linkage system 62 includes a first swing arm 64 and a second swing arm 66. The first swing arm 64 includes a first end 68 and a second end 70. The first end 68 of the first swing arm 64 is rotatably coupled to the seal module 56. The second end 70 of the first swing arm 64 is rotatably coupled to the door of the opposing-hinged doors 30 to which the seal module 56 is attached. As shown, the second end 70 of the first swing arm 64 is rotatably coupled to the second door 34. The second swing arm 66 also includes a first end 72 and a second end 74. The first end 72 of the second swing arm 66 is rotatably coupled to the seal module 56. The second end 74 of the second swing arm 66 is rotatably coupled to the door of the opposing-hinged doors 30 to which the seal module 56 is attached. As shown, the second end 74 of the second swing arm 66 is rotatably coupled to the second door 34.

The first end 68 of the first swing arm 64 and the first end 72 of the second swing arm 66 are disposed inboard of the second end 70 of the first swing arm 64 and the second end 74 of the second swing arm 66. Throughout this specification, the term "inboard" should be interpreted to mean nearer a center of the vehicle 20. Accordingly, the first end 68 of the first swing arm 64 and the first end 72 of the second swing arm 66, which attach the linkage system 62 to the seal module 56, are disposed nearer a center of the vehicle 20 than the second end 70 of the first swing arm 64 and the second end 74 of the second swing arm 66, which attach the seal module 56 to the second door 34.

The linkage system 62 is configured for moving the seal module 56 along an arcuate path 76 between the sealing position and the withdrawn position. Both the first swing arm 64 and the second swing arm 66 rotate simultaneously to move the seal module 56 along the arcuate path 76. The arcuate path 76 is transverse to the outer surface 36 of the first door 32 and the outer surface 46 of the second door 34. More specifically, the arcuate path 76 is disposed along a generally horizontal plane that is substantially perpendicular to the outer surface 36 of the first door 32 and the outer surface 46 of the second door 34. When moving from the sealing position into the withdrawn position, the arcuate path 76 initially directs the seal module 56 in a substantially transverse direction, away from the outer surface 36 of the first door 32 and the outer surface 46 of the second door 34, and then directs the seal module 56 in a substantially longitudinal direction along the longitudinal axis 28 away from the first door 32. When moving from the withdrawn position into the sealing position, the arcuate path 76 initially directs the seal module 56 in a substantially longitudinal direction along the longitudinal axis 28 toward the first door 32, and then directs the seal module 56 in a substantially transverse direction toward the outer surface 36 of the first door 32 and the outer surface 46 of the second door 34. By moving along the arcuate path 76, the seal module 56 more directly moves to only compress one or more seals (described in greater detail below), and minimizes sliding movement across the seals.

The vehicle 20 may include an actuator 78. The actuator 78 is coupled to the linkage system 62, and is configured for moving linkage system 62 to thereby move the seal module 56. Accordingly, the actuator 78 may move the seal module 56 between the withdrawn position and the sealing position.

The actuator 78 may move the seal module 56 from the withdrawn position into the sealing position, from the sealing position into the withdrawn position, or may alternatively move the seal module 56 from the withdrawn position into the sealing position and from the sealing position into the withdrawn position. The actuator 78 may include, but is not limited to, an electrically actuated device, such as an electric motor or the like.

The vehicle 20 may further include a biasing device 80. The biasing device 80 is coupled to the linkage system 62. The biasing device 80 is also coupled to the second door 34. Accordingly, the biasing device 80 interconnects the linkage system 62 and the second door 34. It should be appreciated that if the seal module 56 is attached to the first door 32, then the biasing device 80 would then interconnect the seal module 56 with the first door 32. The biasing device 80 is configured for biasing the linkage system 62 and thereby the seal module 56 into one of the withdrawn position or the sealing position. Accordingly, if the actuator 78 only moves the seal module 56 in one direction, for example from the withdrawn position into the sealing position, then the biasing device 80 may be configured to move the seal module 56 in the other opposite direction, for example from the sealing position into the withdrawn position. The biasing device 80 may include, but is not limited to, a coil spring or the like.

As noted above, the first door 32 and the second door 34 define a gap 55 therebetween when disposed adjacent each other in a closed position. The seal module 56 includes a cutline seal 82. The cutline seal 82 is configured for engaging the first door 32 and the second door 34 between the gap 55 when in the sealing position to seal between the first door 32 and the second door 34. The cutline seal 82 is fixedly attached to and moveable with the base 60 between the sealing position and the withdrawn position. As noted above, the arcuate path 76 of the seal module 56 brings the cutline seal 82 into sealing engagement with the first door 32 and the second door 34 along a substantially transverse path, substantially perpendicular to the outer surface 36 of the first door 32 and the outer surface 46 of the second door 34, thereby minimizing sliding movement of the cutline seal 82 along one or both of the first door 32 and the second door 34. The cutline seal 82 may be sized and or shaped in any suitable manner capable of sealing the gap 55 between the first door 32 and the second door 34.

The vehicle 20 may further include a first primary seal 84 attached to the first door 32. Alternatively, the first primary seal 84 may be attached to and moveable with the seal module 56. The base 60 of the seal module 56 engages the first primary seal 84 in sealing engagement to seal between the first door 32 and the seal module 56 when the sealing module is in the sealing position. As noted above, the arcuate path 76 of the seal module 56 brings the base 60 into sealing engagement with the first primary seal 84 along a substantially transverse path, substantially perpendicular to the first primary seal 84, thereby minimizing sliding movement of the base 60 along the first primary seal 84.

The vehicle 20 may further include a second primary seal 86 attached to the second door 34. Alternatively, the second primary seal 86 may be attached to and moveable with the seal module 56. The base 60 of the seal module 56 engages the second primary seal 86 in sealing engagement to seal between the second door 34 and the seal module 56 when the seal module 56 is in the sealing position. As noted above, the arcuate path 76 of the seal module 56 brings the base 60 into sealing engagement with the second primary seal 86 along a substantially transverse path, substantially perpendicular to the second primary seal 86, thereby minimizing sliding movement of the base 60 along the second primary seal 86.

Figure 5:
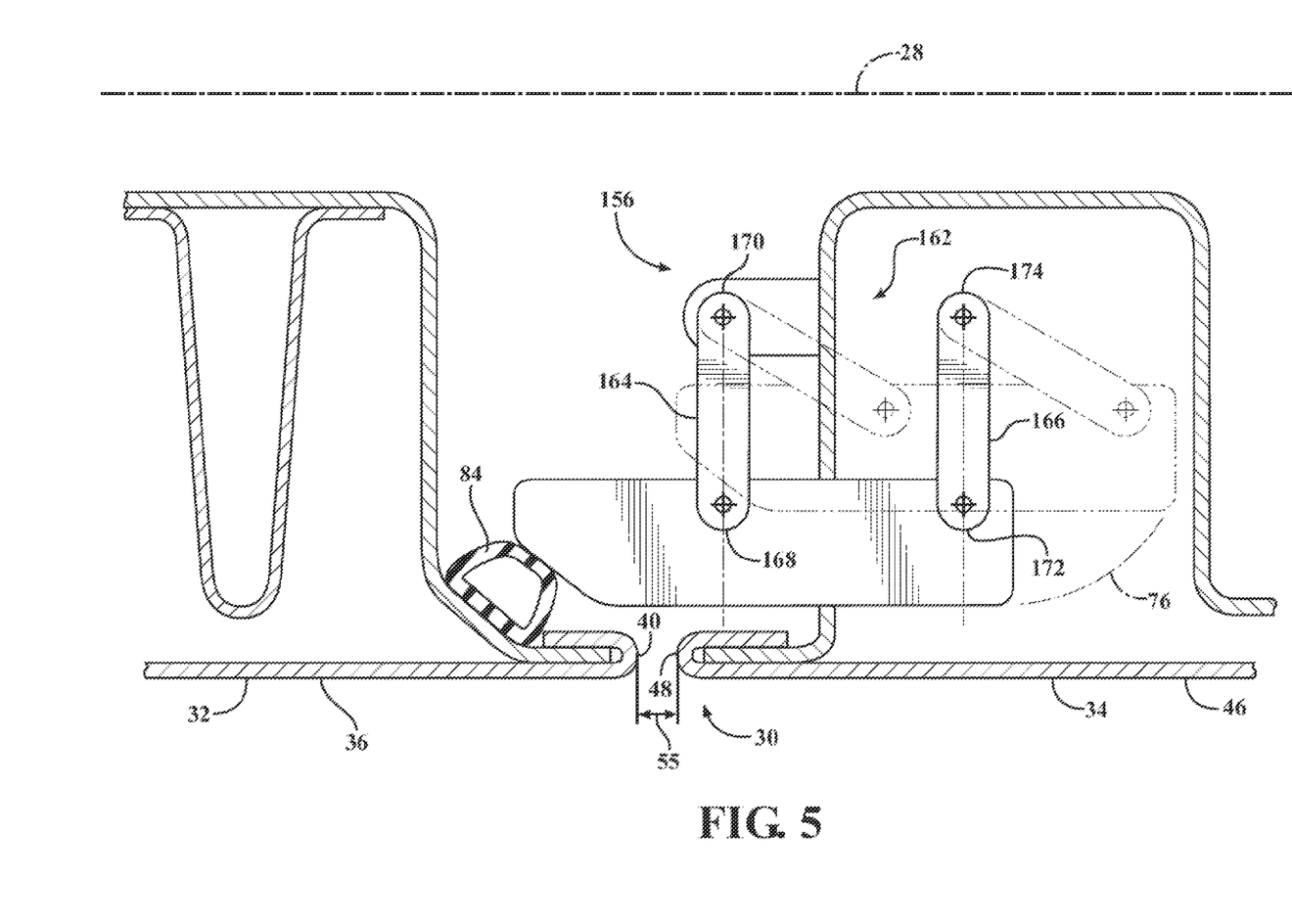
FIG. 5 is a schematic cross sectional view of a first alternative embodiment of the seal module.

Referring to FIG. 5, a first alternative embodiment of the seal module is shown schematically at 156. The seal module 156 includes a linkage system 162. The linkage system 162 pivotably interconnects the seal module 156 and the second door 34. The linkage system 162 includes a first swing arm 164 and a second swing arm 166. The first swing arm 164 includes a first end 168 and a second end 170. The first end 168 of the first swing arm 164 is rotatably coupled to the seal module 156. The second end 170 of the first swing arm 164 is rotatably coupled to the second door 34, i.e., the door of the opposing-hinged doors 30 to which the seal module 156 is attached. As shown, the second end 170 of the first swing arm 164 is rotatably coupled to the second door 34. The second swing arm 166 also includes a first end 172 and a second end 174. The first end 172 of the second swing arm 166 is rotatably coupled to the seal module 156. The second end 174 of the second swing arm 166 is rotatably coupled to the door of the opposing-hinged doors 30 to which the seal module 156 is attached. As shown, the second end 174 of the second swing arm 166 is rotatably coupled to the second door 34.

The second end 170 of the first swing arm 164 and the second end 174 of the second swing arm 166 are disposed inboard of the first end 168 of the first swing arm 164 and the first end 172 of the second swing arm 166. Accordingly, the second end 170 of the first swing arm 164 and the second end 174 of the second swing arm 166, which attach the linkage system 162 to the second door 34, are disposed nearer a center of the vehicle 20 than the first end 168 of the first swing arm 164 and the first end 172 of the second swing arm 166, which attach the linkage system 162 to the seal module 156. The linkage system 162 operates as describe above to move the seal module 156 along the arcuate path 76 in the same manner.

Figure 6:
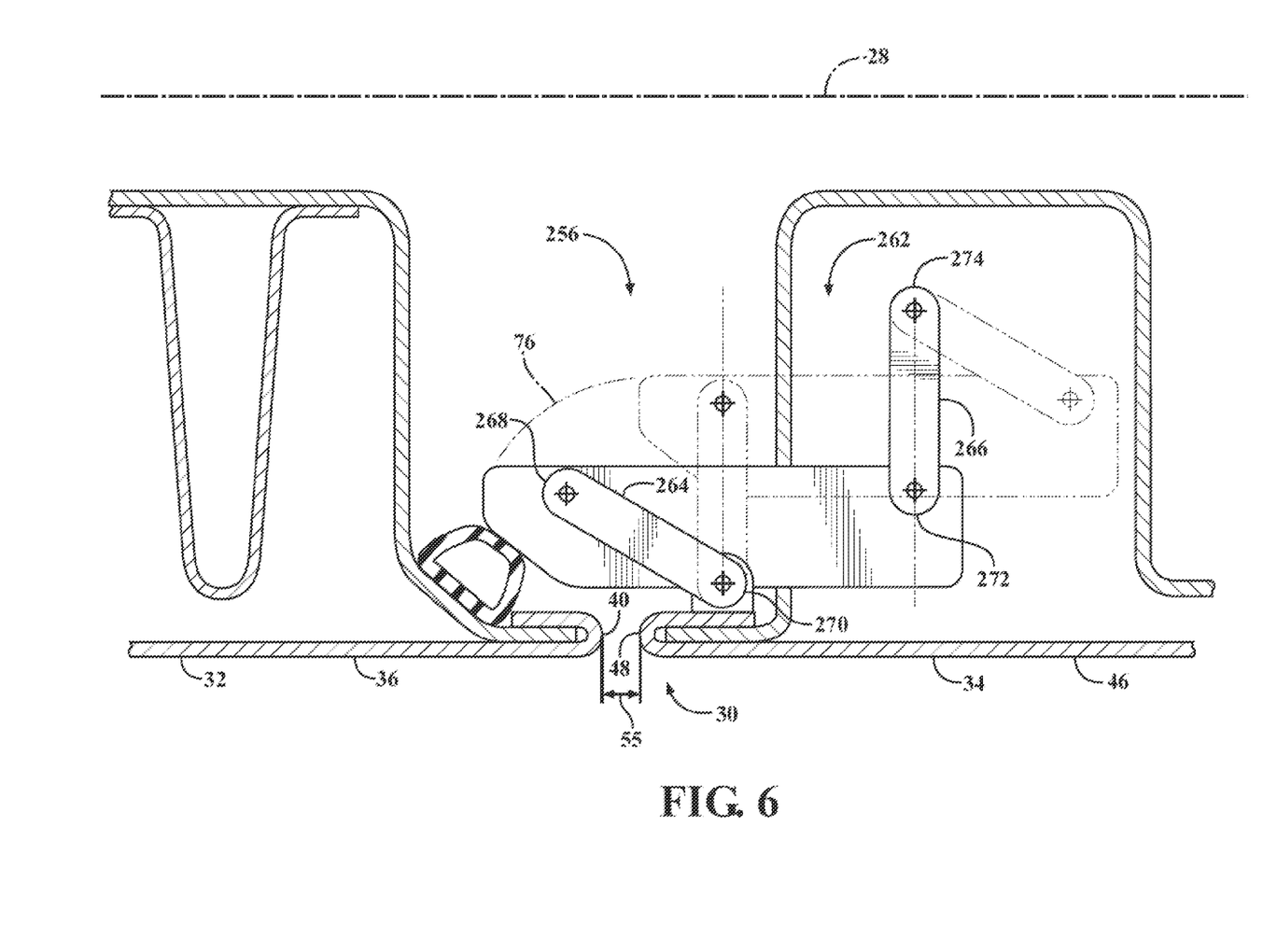
FIG. 6 is a schematic cross sectional view of a second alternative embodiment of the seal module.

Referring to FIG. 6, a second alternative embodiment of the seal module is shown schematically at 256. The seal module 256 includes a linkage system 262. The linkage system 262 pivotably interconnects the seal module 256 and the second door 34. The linkage system 262 includes a first swing arm 264 and a second swing arm 266. The first swing arm 264 includes a first end 268 and a second end 270. The first end 268 of the first swing arm 264 is rotatably coupled to the seal module 256. The second end 270 of the first swing arm 264 is rotatably coupled to the second door 34, i.e., the door of the opposing-hinged doors 30 to which the seal module 256 is attached. As shown, the second end 270 of the first swing arm 264 is rotatably coupled to the second door 34. The second swing arm 266 also includes a first end 272 and a second end 274. The first end 272 of the second swing arm 266 is rotatably coupled to the seal module 256. The second end 274 of the second swing arm 266 is rotatably coupled to the door of the opposing-hinged doors 30 to which the seal module 256 is attached. As shown, the second end 274 of the second swing arm 266 is rotatably coupled to the second door 34.

The first end 268 of the first swing arm 264 is disposed inboard of the second end 270 of the first swing arm 264, and the second end 274 of the second swing arm 266 is disposed inboard of the first end 272 of the second swing arm 266. Accordingly, the first end 268 of the first swing arm 264, which attaches the linkage system 262 to the seal module 256, is disposed nearer the center of the vehicle 20 than the second end 270 of the first swing arm 264, which attaches the linkage system 262 to the second door 34. Furthermore, the second end 274 of the second swing arm 266, which attaches the linkage system 262 to the second door 34, is disposed nearer the center of the vehicle 20 than the first end 272 of the second swing arm 266, which attaches the linkage system 262 to the seal module 256. The linkage system 262 operates as describe above to move the seal module 256 along the arcuate path 76 in the same manner.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a body;
   a pair of opposing-hinged doors mounted to the body, the pair of opposing-hinged doors including a first door and a second door each defining an outer surface;
   a seal module moveable between a sealing position and a withdrawn position, wherein the seal module is disposed in sealing engagement with the first door and the second door when in the sealing position, and wherein the seal module is longitudinally spaced from one of the pair of opposing-hinged doors when in the retracted position to allow independent movement of each of the opposing-hinged doors relative to the other of the opposing-hinged doors;
   a linkage system pivotably interconnecting the seal module and the second door and configured for moving the seal module along an arcuate path, wherein the arcuate path initially directs the seal module away from the first door and the second door and then directs the seal module along a longitudinal axis away from the first door when moving from the sealing position into the withdrawn position, and wherein the arcuate path initially directs the seal module toward the first door along the longitudinal axis and then directs the seal module toward the first door and the second door when moving from the withdrawn position into the sealing position;
   wherein the linkage system includes a first swing arm having a first end rotatably coupled to the seal module and a second end rotatable coupled to the second door, and a second swing arm having a first end rotatably coupled to the seal module and a second end rotatably coupled to the second door; and
   an actuator coupled to the linkage system and configured for moving the seal module between the withdrawn position and the sealing position.

2. A vehicle as set forth in claim 1 wherein the arcuate path moves along a plane substantially perpendicular to the first door and the second door.

3. A vehicle as set forth in claim 1 wherein both the first swing arm and the second swing arm rotate simultaneously to move the seal module along the arcuate path between the sealing position and the withdrawn position.

4. A vehicle as set forth in claim 3 wherein the first end of the first swing arm and the first end of the second swing arm are disposed inboard of the second end of the first swing arm and the second end of the second swing arm.

5. A vehicle as set forth in claim 1 wherein the second end of the first swing arm and the second end of the second swing arm are disposed inboard of the first end of the first swing arm and the first end of the second swing arm.

6. A vehicle as set forth in claim 1 wherein the first end of the first swing arm is disposed inboard of the second end of the first swing arm, and the second end of the second swing arm is disposed inboard of the first end of the second swing arm.

7. A vehicle as set forth in claim 1 wherein the actuator moves the seal module from the withdrawn position into the sealing position.

8. A vehicle as set forth in claim 1 wherein the actuator moves the seal module from the sealing position into the withdrawn position.

9. A vehicle as set forth in claim 1 wherein the actuator includes an electrically actuated device.

10. A vehicle as set forth in claim 1 further comprising a biasing device coupled to the linkage system and configured for biasing the seal module into one of the withdrawn position or the sealing position.

11. A vehicle as set forth in claim 1 wherein the first door and the second door define a gap therebetween when disposed adjacent each other in a closed position, and wherein the seal module includes a cutline seal configured for engaging the first door and the second door between the gap when in the sealing position to seal between the first door and the second door.

12. A vehicle as set forth in claim 11 further comprising a first primary seal in sealing engagement with the seal module and the first door when the seal module is in the sealing position.

13. A vehicle as set forth in claim 12 further comprising a second primary seal in sealing engagement with the seal module and the second door when the seal module is in the sealing position.

14. A vehicle as set forth in claim 13 wherein first primary seal and the second primary seal are attached to the first door and the second door respectively, and the cutline seal is attached to and moveable with the seal module.

15. A vehicle comprising:
   a body;
   a first door pivotable relative to the body in a first pivot direction and a second door pivotable relative to the body in a second pivot direction, wherein the second door and the first door are disposed adjacent each other, the second pivot direction is opposite the first pivot direction;
   a seal module moveable between a sealing position and a withdrawn position, wherein the seal module is disposed in sealing engagement the first door and the second door when in the sealing position, and wherein the seal module is longitudinally spaced from one of the pair of opposing-hinged doors when in the retracted position to allow independent movement of each of the opposing-hinged doors relative to the other of the opposing-hinged doors; and a linkage system pivotably interconnecting the seal module and the second door and configured for moving the seal module along an arcuate path;

wherein the arcuate path is moveable along a generally horizontal plane;

wherein the arcuate path initially directs the seal module away from the first door and the second door and then directs the seal module in a substantially longitudinal direction away from the first door when moving from the sealing position into the withdrawn position, and wherein the arcuate path initially directs the seal module in a substantially longitudinal direction toward the first door and then directs the seal module toward the first door and the second door when moving from the withdrawn position into the sealing position;

wherein the linkage system includes a first swing arm having a first end rotatably coupled to the seal module and a second end rotatably coupled to the second door, and a second swing arm having a first end rotatably coupled to the seal module and a second end rotatably coupled to the second door; and an actuator coupled to the linkage system and configured for moving the seal module between the withdrawn position and the sealing position.

16. A vehicle as set forth in claim 15 further comprising a biasing device coupled to the linkage system and configured for biasing the seal module into one of the withdrawn position or the sealing position.

* * * * *